United States Patent [19]

Weinger

[11] 3,774,076
[45] Nov. 20, 1973

[54] ELECTRONIC CIRCUIT BREAKER
[75] Inventor: Ralph Weinger, Cheltenham, Pa.
[73] Assignee: Elco Corporation, Willow Grove, Pa.
[22] Filed: July 21, 1972
[21] Appl. No.: 274,010

[52] U.S. Cl. .................. 317/33 SC, 317/38, 317/54
[51] Int. Cl. ............................................. H02h 3/08
[58] Field of Search ............. 317/54, 33 SC, 36 TD, 317/154, 38

[56] References Cited
UNITED STATES PATENTS
3,299,322   1/1967   Roberts ........................... 317/36 TD Primary Examiner—James D. Trammell
Attorney—David Roy Pressman

[57] ABSTRACT

An electronic circuit breaker arranged to deenergize a load when its current exceeds a first predetermined value or when its current exceeds a second (lesser) predetermined value for a predetermined interval. The circuit breaker includes an electronic switch which is in series with the load and which is arranged to remain conductive after its control electrode is energized, so long as a potential difference exists across its maintain electrodes; a pulse generator arranged to apply a series of pulses to said control electrode; a bistable switch which controls the generator; an attenuator and integrator for actuating said switch in response to either a relatively high voltage or a relatively medium-valued voltage of a predetermined duration; and means for supplying to said attenuator and integrator a voltage proportional to the load current. The foregoing circuitry is energized by a latch circuit comprising a momentary contact manual switch paralleled by a photoresistor which is responsive to a light source. The light source is energized whenever the load is energized. Thus actuation of the manual switch will turn on the pulse generator, causing the load to be energized, whereby the photoresistor will bypass the manual switch when the manual switch is released. When a short or overload current occurs, the pulse generator will be stopped, turning off the electronic switch and releasing the latch, whereby the circuit will remain off until the fault is corrected and the manual switch is reactuated.

13 Claims, 2 Drawing Figures

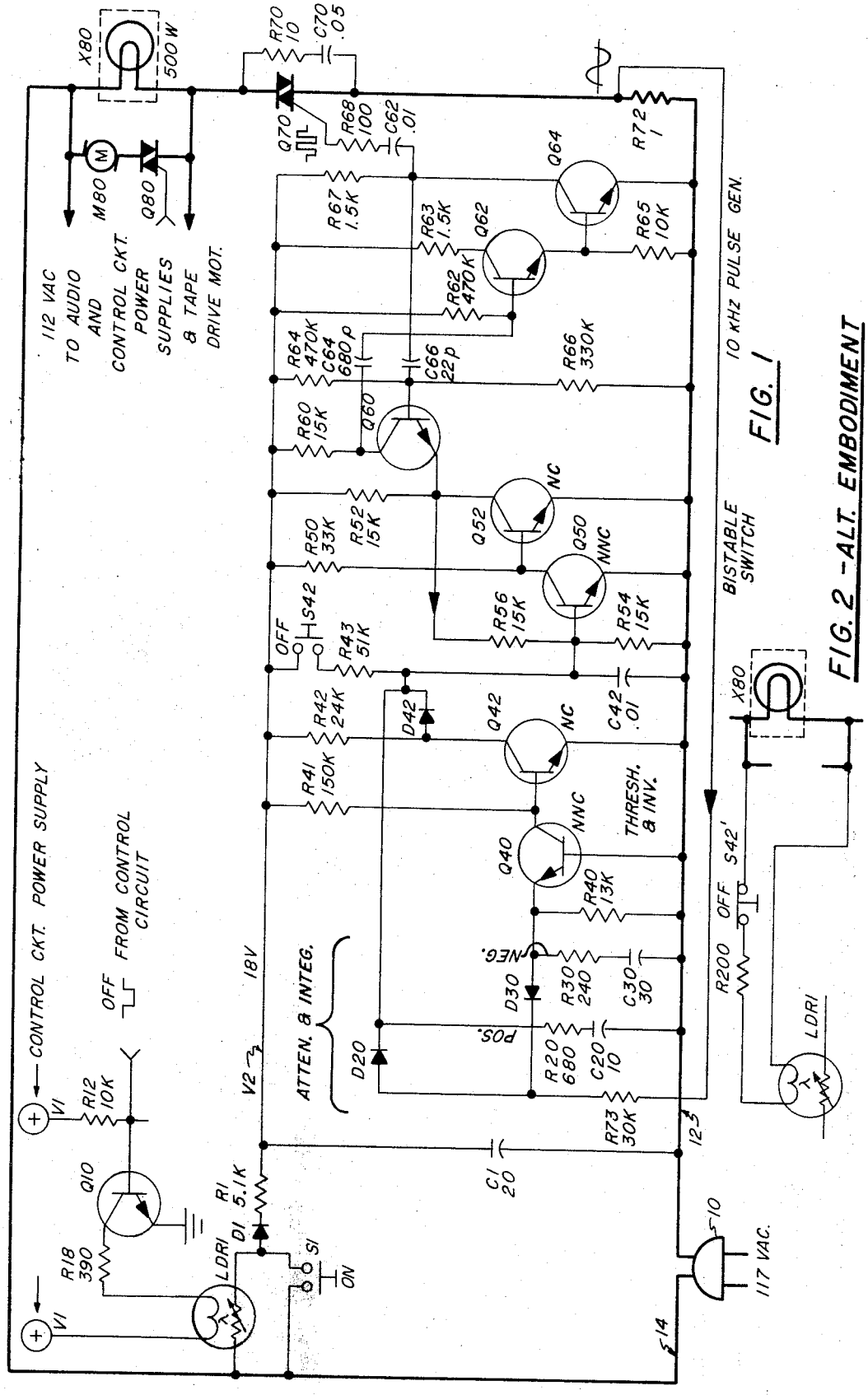

ELECTRONIC CIRCUIT BREAKER

BACKGROUND

1. Field of Invention

This invention relates to circuit breakers and particularly to an electronic circuit breaker of the type which will automatically interrupt the supply of power to a load if, for values of current above a predetermined threshold, the time-current product drawn by said load exceeds a predetermined threshold. The circuit breaker is especially suitable for use in projectors of the type employing a high current incandescent lamp.

2. Description of Prior Art

Heretofore overload protection circuit breakers have comprised generally fuses, i. e., fusible metallic links which melt and thereby break the circuit if the current therethrough exceeds a predetermined value. Such fuses are undesirable because they cannot be fabricated to work with great accuracy, they must be removed and replaced manually (a time consuming and troublesome operation, especially where personnel with low mechanical ability are involved), and can usually work for one current value only, rather than for various current values of a given current-time product. Electromechanical circuit breakers also suffer from lack of accuracy, poor reliability, and inability to accomodate various current values of a given current-time product.

Wholly electronic circuit breakers are available, but these lack versatility in that they cannot open the circuit quickly in certain instances, are not versatile in that they cannot accomodate surges of current or other current values of a given current-time product.

Accordingly several objects of the present invention are: (1) to provide a new and improved circuit breaker of the electronic type, (2) to provide an electronic circuit breaker which is sensitive to various current values above a predetermined current threshold for a given current-time product, (3) to provide a circuit breaker which does not need to be mechanically reset, which has high accuracy, which is very reliable, and which is economical. Further objects are to provide a circuit breaker which is intimately connected with the on/off switches of an item of equipment, which can be disengaged by electronic means which provides complete isolation between a control circuit and the power supply circuit, and to provide an electronic circuit breaker which is especially suitable for use with projectors and other devices employing high current incandescent lamps. Additional objects and advantages of the present invention will become apparent from a consideration of the ensuing description thereof.

DRAWINGS

The single sheet of drawing shows in FIG. 1 a preferred embodiment of the invention and in FIG. 2 an alternative embodiment of the invention. Since the circuit of the alternative embodiment is substantially identical to that of FIG. 1, FIG. 2 illustrates substantially only those components which differ from the circuit of FIG. 1. Conventional terminology and symbology is used, with resistor values indicated in ohms and capacitor values in microfarads, except where the symbol $p$ (picofarads) is used. Power circuitry is indicated by heavy lines and control circuitry (including circuit breaker according to the invention) is illustrated in lighter lines.

DESCRIPTION OF PREFERRED EMBODIMENT

The circuit breaker of the invention is illustrated in conjunction with part of the circuitry of a single frame by single frame (discontinuous) audio filmstrip projector of the type which employs a dual track tape recording, one track of which contains an audio presentation, the second track of which provides control pulses (inaudible) which advance the filmstrip from frame to frame and which turn off the entire projector at the end of the audio-visual presentation.

The projector of FIG. 1 is energized from a conventional AC source 10 which supplies energy to a large incandescent projection lamp X80, to a filmstrip advancing Geneva motor mechanism M80, and as indicated, to audio and control circuit power supplies and a tape drive motor (not illustrated). In series with source 10 and the aforementioned components (hereinafter the "load") is a small resistor R72 and the main electrodes of a triac or solid state thyratron Q70. The control electrode of Q70 is connected to a circuit breaker according to the invention.

When a potential is applied across the main electrodes of Q70 in either polarity, no current will flow because a triac normally has a very high impedance between its main electrodes. However, if a potential difference is also applied between either main electrode and the control electrode, the triac will assume a very low impedance and allow current to flow between its main electrodes. This current will flow as long as a potential difference exists across the main electrodes, even if the potential at the control electrode is removed. The triac will revert from its broken down (low impedance) state to its high impedance state only when the potential difference across its main electrodes is removed.

One side 12 of source 10 will, for purposes of convenience, be designated as a reference or ground potential point and the other side 14 thereof hereafter will be designated simply as source 10. Connected to source 10 is a parallel circuit comprising an ON switch S1 and the photosensitive resistor of a light driven resistor LDR1. As is well known, an LDR is a four terminal device which comprises a light source (two terminals) and a photosensitive cell (two terminals) which assumes a lowered impedance when illuminated by the light source.

Connected in a series path from the output of this parallel circuit (S1 & LDR1) to the reference point is an AC to DC converter comprising a diode D1, a resistor R1, and a capacitor C1. The output of the converter (18 VDC) is supplied on bus V2 which extends from the junction of R1 and C1.

The circuit breaker of the invention comprises the components shown generally below bus V2, and for purposes of convenience are classified into separate sub-circuits, each of which is appropriately labeled. An AC feedback voltage for the circuit breaker is derived across series load resistor R72 and is supplied via an isolating resistor R73. The feedback voltage is supplied from R73 to two attenuator and integrator (A & I) circuits. One A & I circuit comprises D20, R20, and C20 and handles positive voltage components, and another A & I circuit comprises D30, R30, and C30 and handles negative voltage components.

The output of the "negative" A & I circuit is supplied to a threshold and inverter circuit whose first, threshold stage consists of a normally nonconductive (NNC) grounded base transistor Q40, plus resistors R40 and R41, and whose second, inverter stage consists of a normally conductive (NC) grounded emitter transistor Q42, plus resistor R42. The output of the threshold and inverter circuit is supplied via an isolating diode D42 to the base of transistor Q50 which comprises the input of a bistable switch.

The output of the "positive" A & I circuit is supplied directly to the base of Q50 of the bistable switch.

The base of Q50 receives a third or OFF input from a manual OFF switch S42. When switch S42 is pressed, V2 will be connected to the base of Q50 via S42 and R43. Thus the bistable switch can receive an input from the positive A & I circuit, an input from the negative A & I circuit, and an input from the OFF switch.

The bistable switch comprises two cascaded common-emitter transistor amplifying stages with overall positive feedback which gives the switch two stable states. The first stage of the switch comprises a normally nonconductive (NNC) transistor Q50, whose base is connected to ground by a filter capacitor C42 and a bias resistor R54 and which receives the positive feedback via R56. The collector of Q50 is connected to bus V2 via R50 and directly to the base of a normally conducting (NC) transistor Q52. The collector of Q52 is connected to V2 via R52, to the base of Q50 via R56, and directly to the emitter of Q60 of a pulse generator.

In the normal or "ON" state of the bistable switch, Q52 is on and thereby provides a very low impedance between the emitter of Q60 and ground. When the switch is turned "OFF" by a positive voltage at the base of Q50, a high impedance is provided between Q60's emitter and ground. In the present circuit, the switch can be reset to its normally on state only if the voltage on bus V2 is first reduced to about 2V or less.

The pulse generator is a 10 kHz oscillator (astable multivibrator) which is normally free running, but which is stopped or quenched when the bistable switch is in its off state.

The pulse generator comprises transistors Q60, Q62, and Q64. The collector of Q64 is coupled to the base of Q60 via C66 and the collector of Q60 is coupled to the base of Q62 (whose emitter drives the base of Q64) via C64. The collector of Q60 is connected to V2 via R60 and its base is connected to the junction of a voltage divider comprising R64 and R66. The base of Q62 is connected to V2 via R62, its collector is connected to V2 via R63 and its emitter, in addition to being connected to the base of Q64, is connected to ground via R65. The collector of Q64 is connected to V2 via R67 and to the control electrode of triac Q70 via the series combination of C62 and R68.

The circuit breaker may also receive a "turnoff" input from the projector's control circuit at the end of an audio-visual presentation. Such an input comprises a negative pulse, which, as shown, is applied to the base of a transistor Q10. The base of Q10 is also connected to the control circuit's positive supply source V1 via R12, its emitter is grounded, and its collector is connected to V1 via the lamp of LDR1 and a series resistor R18.

DESCRIPTION OF ALTERNATE EMBODIMENT (FIG. 2)

The alternate embodiment of FIG. 2 is similar to that of FIG. 1 except it does not contain the following components (which FIG. 1 contains): S42, R43, V1, Q10, R18, and R12. Instead the lamp of LDR1 is connected across projector lamp X80 via a suitably valued resistor R200 and a normally closed OFF switch S42[1].

OPERATION — FIG. 1

The operation of the circuit of FIG. 1 will be described in a series of steps which detail to an actual operating sequence of the projector.

1. S1 is pressed in order to turn the projector on

AC from the 117VAC source flows through S1, is rectified by D1, dripped in voltage by R1, and filtered by C1, applying DC voltage to the collector circuit of each transistor.

Q40, having no forward base-emitter bias, remains off.

Q42, being forward biased via R41, turns on, providing a relatively low voltage at the anode of D42: D42 remains nonconductive and no input is supplied to the bistable switch comprising Q50 and Q52.

Q52, being more strongly forward biased via R50 than is Q50 by the voltage from the divider consisting of R52-R56-R54, turns on, providing a relatively low voltage at its collector and hence at the base of Q50, whereby Q50 remains nonconductive.

Q60, whose emitter is connected to ground via a relatively low resistance constituted by conducting transistor Q52, can conduct, whereby the oscillator comprising Q60, Q62, and Q64 can run, so that pulses are supplied to the control electrode of Q70 from Q64 via C62 and R68.

Q70, receiving continuous pulses on its control electrode, conducts on each half-cycle applied to the main electrodes thereof, so that the line voltage, less small drops across R72 and Q70, is applied across lamp X80, turning the lamp on and energizing the control circuits and motors in the projector. (X80, when first energized, draws a large current surge due to its relatively low "cold" resistance, causing a relatively high feedback voltage to appear across R72. However, the time-voltage product of this feedback voltage is insufficient to trip the breaker circuit because, as explained more fully below, it does not persist for a sufficient interval. Moreover although the surge is above the continuous current rating of Q70, it does not exceed the single cycle or surge rating of Q70.)

V1 becomes energized, turning on Q10, which allows current to flow from V1, through the lamp of LDR1 and R18, to ground.

LDR1's lamp illuminates LDR1's photoresistor, causing the photoresistor to assume a lowered impedance, thereby providing a conductive path in parallel with S1.

2. S1 is released

No change occurs because current for the control circuit continues to flow through the illuminated photoresistor of LDR1.

3. X80 or other load component shorts, i. e., a high current short (above the single cycle rating of Q70) occurs.

A: Short Occurs During Positive Half Cycle

If the short occurs when a positive half cycle of the AC feedback voltage appears across R72, this positive voltage will increase very rapidly due to the greatly increased current through R72. The feedback voltage will be applied, via R73, to oppositely polarized diodes D20 and D30.

D30 will be back-biased, and hence will block the feedback voltage, but D20 will be forward-biased, allowing the feedback voltage to be supplied to R20 and C20.

C20, being substantially uncharged, will present substantially zero impedance to the rapidly rising positive feedback voltage, so that the feedback voltage will "see" only a voltage divider consisting of the series path provided by R73 and R20. The divider will provide a severely attenuated version of the feedback voltage at the junction of D20 and R20, whereby the attenuated, yet positive-going voltage, will be supplied to the base of Q50 of the bistable switch.

Q50 is turned on by this increase in its base voltage, causing its collector voltage to fall, turning off Q52, whose collector voltage rises, providing positive feedback to accelerate the turnon of Q50 and turnoff of Q52.

Q60's emitter circuit is opened when Q52 turns off, whereby Q60, and hence the entire oscillator comprising Q60, Q62, and Q64 turns off, terminating the enabling pulses at the control electrode of Q70.

Q70 therefore turns off upon termination of the current half-cycle of AC voltage across the main electrodes thereof, whereby the short circuit current is interrupted within one half-cycle.

X80 and the control circuit power supplies receive no further AC energy, whereby the control circuit power supply voltage V1 falls to zero.

LDR1's lamp receives no further current, whereby the lamp turns off. Thus the resistance of the photoresistor of LDR1 increases greatly, reducing the voltage in the circuit breaker power supply to zero.

B: Short Occurs During Negative Half Cycle

If the short occurs when a negative half cycle of the AC feedback voltage appears across R72, a rapidly increasing negative feedback voltage will back-bias D20 and forward bias D30.

In a manner similar to that occuring with a "positive" short, C30 will present substantially zero impedance to the rapidly increasing negative feedback voltage, whereby the feedback voltage will "see" only a voltage divider consisting of R73 and R30, so that a severely attenuated negative voltage will be presented to the emitter of Q40.

When the voltage at the emitter of threshold transistor Q40 falls to about −0.6 volt, Q40 will be turned on, causing more current to be drawn through R41 than merely that required to forward-bias Q42, whereby the voltage at the base of inverter Q42 will fall and Q42 will be turned off.

When Q42 turns off, the voltage at its collector will rise, supplying to the base of Q50, via D42, an attenuated, yet positive-going voltage of sufficient magnitude to turn the bistable switch off. (Q40 and Q42 are provided in the "negative" attenuator and integrator circuit as one way of providing, in response to a negative feedback voltage, a duplicate output, in voltage and polarity, to the output which the "positive" attenuator and integrator provides in response to a positive feedback voltage.)

Thus current through Q70 will be stopped (within one half cycle) in the same manner as when a positive short occurred, supra.

4. X80 or other load component draws excessive current, i.e., above the continuous current rating of Q70, for a sufficient interval of time.

The increased AC in R72 causes the AC feedback voltage across R72 to increase, which in turn increases the AC feedback voltage applied to D20 and D30.

D20 is continuously passing the positive half cycles of the feedback voltage, and D30 the negative half cycles, providing full wave rectification and thereby charging C20 and C30 slightly. The present increase in feedback voltage will be relatively slow (compared to that occurring during a short), so that the rectified positive and negative voltages applied to C20 and C30 will also increase relatively slowly and the charge on these capacitors will increase slowly.

If the excessive load current persists for a sufficient interval, which is governed by the selected values of the circuit parameters, D20 will charge sufficiently so that the positive voltage, thereacross, which is applied to the base of Q50 via R20, will be great enough to turn the bistable switch off. Simultaneously, C30 will also charge sufficiently so that the negative voltage thereacross, which is applied to the emitter of Q40 via R30, will be great enough to turn Q40 on, which will turn Q42 off, which in turn will also serve to turn the bistable switch off.

Thus current through Q70 will be stopped (before damage can occur) in the same manner as described above.

5. After the projector has turned off because of a short, S1 is pressed in an attempt to turn it on again.

The voltage on V2 will rise, turning on the bistable switch and the oscillator. The control electrode of Q70 will be pulsed, turning on Q70, allowing current to flow to the load.

Because of the short, the load current will increase very rapidly, whereupon the attenuator and integrator will supply a sufficiently positive voltage to the base of Q50 to turn the bistable switch, and hence Q70, off in the manner described supra.

If the bistable switch is held down while the circuit breaker is turning Q70 off in response to a short, V2 will remain at 18V before, during, and after Q70 turns off. Once the bistable switch turns off, it will remain in its "off" stable state (and thus hold the 10 kHz oscillator and Q70 off) as long as it is energized from bus V2.

If S1 is then released, the 18V potential on V2 will fall gradually according to an RC time constant determined by the capacitance of C1 and the impedance of the load presented to bus V2.

If S1 is again pressed before the voltage on bus V2 drops below reset value (about 2V with the components shown), V2 will rise to 18V, but the bistable switch will remain off because Q50 will still be conducting sufficiently to keep the base voltage of Q52 below turn-on value.

In order to reset the bistable switch to its on state (after it has switched to its off state due to a short or overload), a sufficient interval must elapse to allow the potential on V2 to drop below reset value. (This delay requirement, coupled with the fact that the bistable switch is self-resetting by means of a potential drop, is advantageous since (1) it makes the circuit breaker foolproof, i.e., there is no way to defeat the automatic breaker feature (and thereby possibly damage Q70) by manual minipulation of S1, (2) no separate reset switch is required, and (3) the mandatory time delay induces an operator to take time to recognize and analyze the fault in the equipment.)

6. S42 is pressed in order to turn the projector off manually.

Q50 receives at its base a positive voltage via R43, turning Q50 on, Q52 off, the pulse generator off, and Q70 of in the manner described above.

7. The control Circuit supplies a negative pulse to the base of Q10 to turn the projector off automatically.

Q10 receives the negative turnoff pulse at its base, thereby turning off Q10 and thus terminating current in the lamp of LDR1. The resistance of the photoresistor of LDR1 increases greatly in value, thereby reducing the voltage on bus V2, whereupon Q70 turns off, as above described.

OPERATION — FIG. 2

The circuit of FIG. 2 is similar to that of FIG. 1 except that the FIG. 2 circuit has no automatic turnoff circuit. In FIG. 2, the entire projector is turned off manually by opening S42, thereby turning off the lamp of LDR1, causing the photoresistor of LDR1 to reassume a very high impedance. The supply of energy to the circuit breaker will thereupon be terminated, so that Q70 will no longer be pulsed, causing the supply of current to the load to be terminated.

While the above description contains many specifities, these are not intended to limit the scope of the invention but merely to exemplify one perferred embodiment thereof. The scope of the invention is intended to be indicated by the subject matter of the appended claims and their legal equivalents.

I claim:

1. An electronic circuit breaker, comprising:
a. a source of electrical energy, a load, and switch means having two main electrodes which are connected in a series circuit with said source and said load, said switch means having a control electrode and arranged to provide, upon energization of said control electrode, a substantially conductive path between said main electrodes thereof for current flow in either direction, even after said energization of said control electrode is removed, so long as a potential difference exists between said main electrodes,
b. pulse generator means for energizing said control electrode with pulses having a repetition rate greater than the frequency of said alternating current source,
c. current responsive means for disenabling said pulse generator means if the current in said load exceeds a predetermined value, and
d. energy control means for removing supply energy to and thereby disenabling said pulse generator means if the energization of said load is interrupted.

2. The circuit breaker of claim 1 wherein said energy control means comprises a manually operable push button switch for energizing said pulse generator means and latch means for maintaining said pulse generator means energized in response to energization of said load, even after said manually operable switch is opened.

3. The circuit breaker of claim 2 wherein said latch means for maintaining said pulse generator means energized comprises variable means, in shunt with said switch, having a normally high impedance and control means for causing the impedance of said variable means to assume a substantially lower value when said load is energized.

4. The circuit breaker of claim 2 wherein said variable means comprises a photosensitive resistor and said control means comprises a source of optical energy arranged to illuminate said resistor when said load is energized.

5. The circuit breaker of claim 1 wherein said source of electrical energy supplies alternating current, said switch means is a triac, and said pulse generator means comprises an astable multivibrator.

6. The circuit breaker of claim 1 wherein said current responsive means comprises conversion means for providing a voltage proportional to the current in said load, and switch means arranged to open a current path within, and thereby disenable, said pulse generator if the voltage provided by said conversion means exceeds a predetermined value.

7. The circuit breaker of claim 6 wherein said conversion means comprises a current-to-voltage converter, and attenuator and integrator means arranged for coupling the output of said converter to said switch means, and for (a) disenabling said pulse generator means, and hence the supply of energy to said load, relatively rapidly if the current in said load exceeds a first, relatively high predetermined value, and (b) disenabling said pulse generator means, and hence the supply of energy to said load, after an interval if the current in said load is less than said first, relatively high predetermined value, but exceeds a second, relatively lower predetermined value.

8. The circuit breaker of claim 7 wherein said attenuator and integrator means compress first and second resistors and a capacitor connected in a series path across the output of said current-to-voltage converter, said switch means being connected to a junction point between said first and second resistors, whereby said capacitor will present a relatively low impedance to any relatively rapidly rising voltage from said converter so that said first and second resistors will serve as a voltage divider, and said capacitor will charge in response to any relatively slowly rising voltage from said converter so that said first resistor and capacitor will serve as an integrator.

9. The circuit breaker of claim 7 wherein said source of electrical energy supplies alternating current and said attenuator and integrator means includes rectifier means for rectifying the output of said current responsive means.

10. The circuit breaker of claim 6 wherein said switch means comprises a bistable circuit arranged to present either a relatively low or a relatively high impedance in series with one circuit of said pulse generator means.

11. The circuit breaker of claim 1 wherein
a. said source of electrical energy supplies alternating current, said load is a projection lamp and a projector operating circuit, said switch means is a triac,
b. said pulse generator means is an astable multivibrator,
c. said current responsive means comprises a resistor in series with said load for providing a voltage proportional to the current through said load, an attenuator and integrator responsive to the voltage across said resistor, means for rectifying the voltage supplied to said attenuator and integrator, and a bistable switch having a normally low impedance in series with one circuit of said astable multivibrator, said bistable switch being arranged to assume a relatively high impedance, thereby to disenable said multivibrator, in response to a predetermined voltage input from said attenuator or said integrator, and, d. said energy control means comprises a manually operable push button switch paralleled by a photosensitive resistor and a source of optical energy arranged, upon energization thereof, to supply optical energy to said resistor so as to lower substantially the resistance of said resistor and thereby provide a bypass of said manually operable switch, said source of optical energy connected to be energized wherever said load is energized.

12. An electronic circuit breaker, comprising:
a. a source of electrical energy, a load connected to said source, and interrupter means for disconnecting said source from said load in response to a voltage of a predetermined magnitude supplied to an input of said interrupter means,
b. conversion means for providing a voltage proportional to the current supplied to said load by said source, and
c. attenuator and integrator means responsive to said proportional voltage and comprising a capacitor and first and second resistors connected in a series path, said input of said interrupter means being connected to a junction point between said first and second resistors, whereby if a short occurs in said load, said proportional voltage will rise relatively rapidly, said capacitor will present a relatively low impedance to said voltage, and said first and second resistors will act as a voltage divider, and if an overload current occurs in said load, said proportional voltage will rise relatively slowly and said capacitor will charge, so that said first resistor and said capacitor will integrate said voltage.

13. The circuit breaker of claim 12 wherein said interrupter means comprises a bistable circuit and controllable switch means for allowing current to flow from said source to said load when said bistable circuit is in a reset state and substantially preventing current flow from said source to said load when said bistable circuit is in a set state, and further including an ON switch for selectively energizing said bistable circuit, said bistable circuit including means for causing it to proceed to its reset state when energized, whereby said controllable switch means will allow said source to energize said load when said bistable switch is energized, said bistable switch arranged to be set, and thereby interrupt the supply of energy to said load, in response to a predetermined output from said integrator and attenuator means, said bistable switch being resettable only by lowering the energizing voltage for said bistable switch to a predetermined value.

* * * * *